United States Patent

Reiland

[15] 3,683,436

[45] Aug. 15, 1972

[54] METHOD FOR MAKING A DRILL SCREW WITH AN EXTRUDED POINT

[72] Inventor: Bernard F. Reiland, Rockford, Ill.

[73] Assignee: Textron Inc., Rockford, Ill.

[22] Filed: Jan. 22, 1970

[21] Appl. No.: 4,940

[52] U.S. Cl. .................................... 10/10 R, 10/27 E

[51] Int. Cl. .................................... B21k 1/44, B23g 9/00

[58] Field of Search ............ 10/2, 4, 9, 10, 21, 24, 27, 10/31, 35, 40, 53, 59, 61, 70; 72/470; 85/41, 47

[56] References Cited

UNITED STATES PATENTS

| | | | |
|---|---|---|---|
| 3,079,831 | 3/1963 | Gutshall | 85/47 |
| 3,241,426 | 3/1966 | Gutshall | 85/47 |
| 3,318,182 | 5/1967 | Carlson | 85/41 |
| 3,463,045 | 8/1969 | Prescott | 85/41 |
| 3,517,542 | 6/1970 | Sklerski | 10/4 X |
| 3,072,933 | 1/1963 | Carlson | 10/27 |

*Primary Examiner*—Charles W. Lanham
*Assistant Examiner*—E. M. Combs
*Attorney*—Buckhorn, Blore, Klarquist and Sparkman

[57] ABSTRACT

A method of making a drill point, self-thread-forming screw comprises cold forging the work-entering end of a screw blank between laterally movable complementary die members which completely enclose the blank end to achieve unrestricted longitudinal extrusion of the complete cross section of the screw and at the same time controlled lateral expansion thereof. Offset jaws on the die members form a pair of flutes extending the length of the drill point on opposite sides thereof and land portions therebetween. Such land portions are provided with a hook at the work-entering extremities of the forward faces thereof. Due to control of the lateral expansion of the blank end, no flashings are formed on the drill point, which requires only a sharpening operation for completion.

6 Claims, 15 Drawing Figures

68
54
56
62
66
60
67
63
70
70
72
58
13
13

FIG. 1
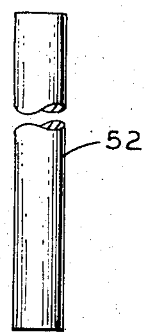
FIG. 2
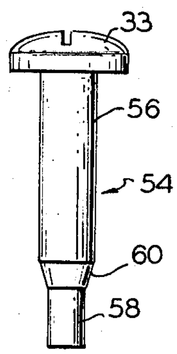
FIG. 3
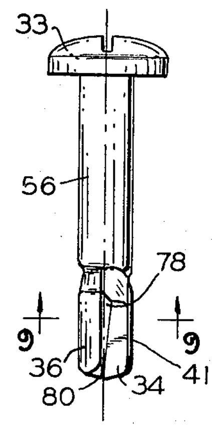
FIG. 4
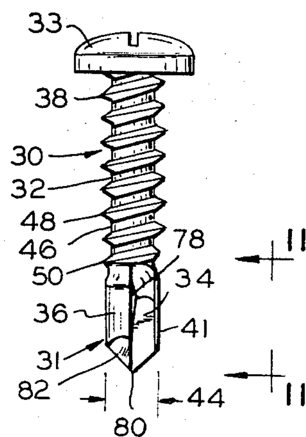
FIG. 5
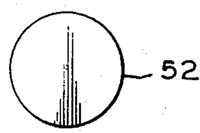
FIG. 6
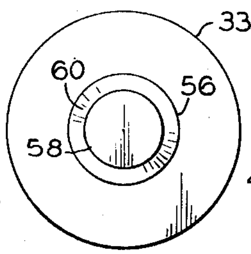
FIG. 7
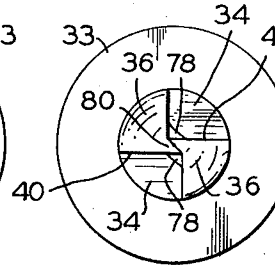
FIG. 8
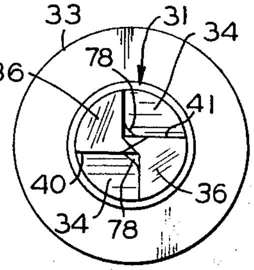
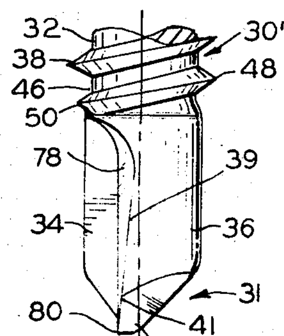
FIG. 11
FIG. 9
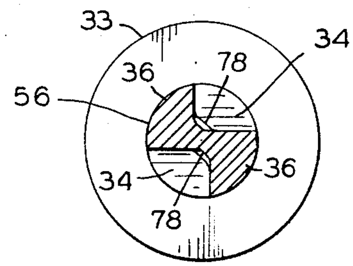
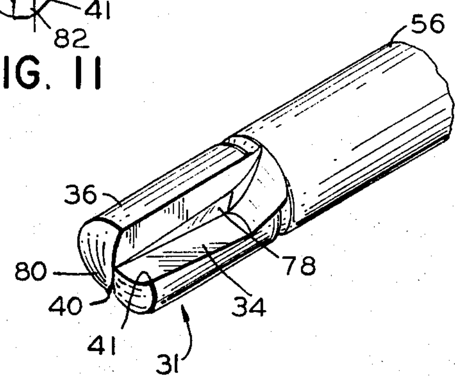
FIG. 10
BERNARD F. REILAND
*INVENTOR*
BY
*BUCKHORN, BLORE, KLARQUIST & SPARKMAN*
*ATTORNEYS*

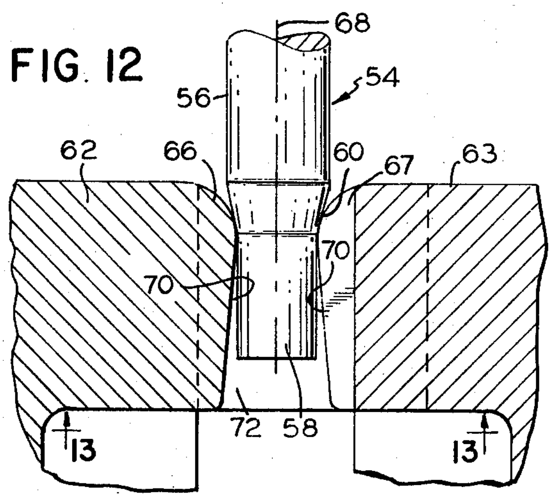
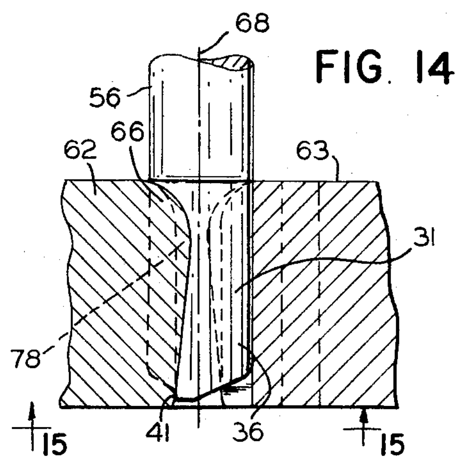
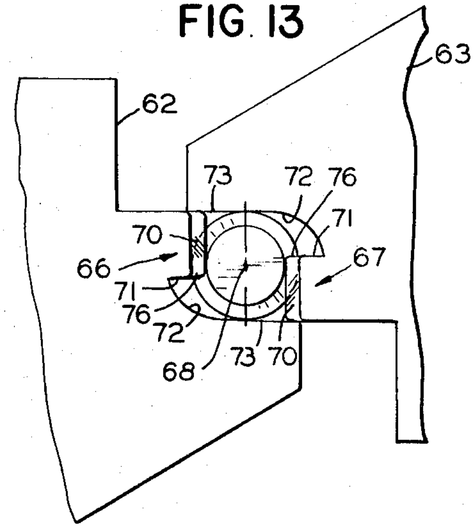
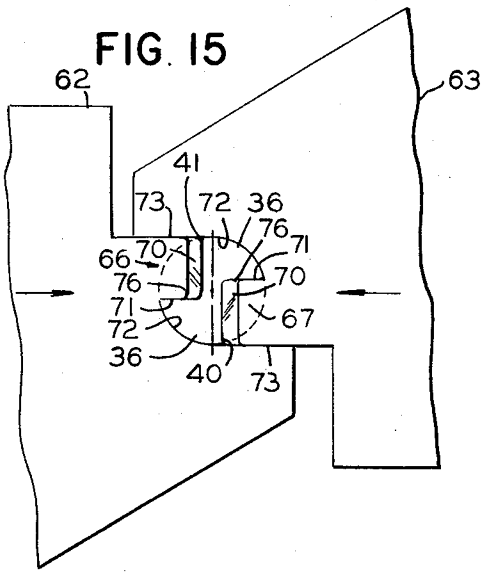
BERNARD F. REILAND
*INVENTOR*
*BY*
*BUCKHORN, BLORE, KLARQUIST & SPARKMAN*
*ATTORNEYS*

METHOD FOR MAKING A DRILL SCREW WITH AN EXTRUDED POINT

BACKGROUND OF THE INVENTION

This invention relates to drill point self-thread-forming screws and, more particularly, to drill point, tapping screws in which the work-entering end is cold forged between complementary die members.

Self-thread-forming screws having drill points are desirably formed with a forward rake angle or hook on the cutting edges thereof. Such a screw is disclosed in Carlson U.S. Pat. No. 3,318,182 and has a drill point in which the metal is of relatively higher strength than the metal in the shank, which sharply reduces the number of failures on account of breakage of the drill point.

It is the object of the present invention to provide a new and improved method and apparatus for manufacturing such a self-thread-forming screw with a drill point having a forward rake angle or hook on the cutting edges thereof.

It is a further object of the present invention to provide such a method and apparatus wherein the drill point of a self-thread-forming screw is formed by extruding the same, thereby to achieve a drill point in which a longitudinal grain flow results in an increase in the tensile strength of the point.

It is a further object of the present invention to provide such a method and apparatus wherein the drill point of such a self-thread-forming screw is formed with a controlled lateral expansion so that it achieves an accurately controlled diametrical dimension.

It is a still further object of the present invention to provide such a method and apparatus wherein an extruded drill point is formed on a self-thread-forming screw without the presence of any lateral or side flashing.

It is a still further object of the present invention to provide such a method and apparatus wherein an extruded drill point having a forward rake angle or hook is formed on a self-thread-forming screw in a single step, requiring only a sharpening operation to complete the screw.

SUMMARY OF THE INVENTION

In accordance with these objects, I have provided a method of making a drill point, self-thread-forming screw which comprises the steps of forming a cylindrical workpiece into a blank having a shank portion with a head at one end thereof, a work-entering end portion having a diameter smaller than the diameter of the shank portion, and an inwardly tapering intermediate portion between the shank portion and the end portion.

The invention is characterized by the fact that the drill point is formed by cold forging the end and intermediate portions of the blank between a pair of laterally movable complementary die members which completely surround the sides of such portions to effect both limited lateral expansion and unrestricted longitudinal extrusion thereof. During such cold forging, the dies form a pair of flutes extending the length of the work-entering end and intermediate portions on opposite sides thereof. The dies confine the lateral expansion of the end portion so as not to produce any lateral flashings while forming a pair of longitudinally extending land portions between the flutes with substantially parallel outer side walls, a hook on the forward faces thereof, and a diametrical width substantially equal to the diameter of the shank portion. A longitudinal grain flow is achieved in the drill point which results in a point having a relatively higher tensile strength than does the metal in the shank.

The tip of the drill point is machined to form a pair of cutting edges on the land portions at the forward extremities thereof, and the shank portion is thereafter roll-threaded to form threads thereon.

The invention further provides apparatus for cold forging the work-entering end of the above described blank into the drill point of a self-thread-forming screw. Such apparatus comprises a pair of complementary die members adapted to be moved laterally toward and away from each other. The die members have jaws offset with respect to each other and with respect to the longitudinal centerline of the blank when placed therebetween. The jaws have facing surfaces both of which are inclined relative to the longitudinal centerline of the blank. The jaws form a pair of flutes extending the length of the work-entering end portion of the blank on opposite sides thereof and a pair of longitudinally extending land portions between the flutes which land portions have a forward rake angle on the forward faces thereof.

Each of the die members includes a sidewall portion adapted closely to overlap the jaw of the other die member in such a way as completely to surround the sides of the work-entering end portion of the blank when the same is placed therebetween, thereby to achieve, as the die members are closed, a limited lateral expansion of such portion without producing any lateral flashing.

Each of the die members further comprises a curved wall portion connecting the jaw and the sidewall portion and such curved wall portion has the same radius of curvature as the land portion it forms. The dies have a depth greater than the length of the work-entering end portion of the blank to permit unrestricted longitudinal extrusion of such portion upon closure of the dies, which extrusion achieves the desirable longitudinal grain flow above-mentioned.

The curved wall portions of the die members define segments of a circle when in their fully closed position, thereby to form such land portions with a diametrical width substantially equal to the diameter of the shank portion of the blank. The inclined facing surfaces of the jaws which form the flutes provide the forward faces of the land portions with a hook at the work-entering extremities thereof.

BRIEF DESCRIPTION OF THE DRAWINGS

Other objects and advantages of the invention will become apparent in the following specification when taken in conjunction with the accompanying drawings wherein:

FIG. 1 is an elevational view of the initial cylindrical workpiece from which the drill point, self-thread-forming screw of the present invention is formed.

FIG. 2 is an elevational view showing the workpiece of FIG. 1 after it has been formed into a headed blank.

FIG. 3 is a side elevational view of the blank after the work-entering end and intermediate portions thereof have been cold forged, and illustrates the longitudinal extrusion achieved.

FIG. 4 is an elevational view of a finished screw made by the method and apparatus of the present invention.

FIG. 5 is an end view to an enlarged scale of the cylindrical workpiece illustrated in FIG. 1.

FIG. 6 is an end view to an enlarged scale of the blank illustrated in FIG. 2.

FIG. 7 is an end view to an enlarged scale of the cold forged blank of FIG. 3.

FIG. 8 is an end view to an enlarged scale of the finished screw illustrated in FIG. 4.

FIG. 9 is a sectional view taken on line 9—9 of FIG. 3.

FIG. 10 is a perspective view of the work-entering end of the cold forged blank of FIG. 3.

FIG. 11 is a side view to an enlarged scale of the drill point of the screw illustrated in FIG. 4 taken on line 11—11 thereof.

FIG. 12 is an elevational view partly in section illustrating the position of the complementary die members as they commence the cold forging of the work-entering end of the screw.

FIG. 13 is a view taken on line 13—13 of FIG. 12.

FIG. 14 is an elevational view partly in section illustrating the position of the die members as they complete the cold forging of the work-entering end of the screw.

FIG. 15 is a view taken on line 15—15 of FIG. 14.

DESCRIPTION OF THE PREFERRED EMBODIMENT

Referring to the drawings and in particular to FIGS. 4, 8 and 11, a drill point, self-thread-forming screw 30 is shown with a drill point 31 made by the method and apparatus of the present invention. As will be observed, the screw 30 comprises an elongated shank 32 which terminates at one end in a driving head 33 and at the work-entering end in the drill point 31. The shape of the drill point 31 is, for convenience, described as fluted, the flutes being the pair of segments 34 removed from the circular cross section and leaving land portions 36 remaining therebetween. The drill point 31 is seen to have an effective transverse width larger than the root diameter of the thread on the shank 32 and approximately equal to or slightly larger than the pitch diameter. The shank 32 has a thread 38 thereon extending helically from the drill point 31 to the driving head 33.

The drill point 31 terminates in a pair of cutting edges 40, 41 at the work-entering extremity thereof. As can be seen from FIG. 11, the forward faces 39 of the land portions 36 are given a hook or forward rake angle of approximately 5° which permits the drill point 31 to drill a hole in the work when the screw 30 is turned in the threading direction. Obviously such hook or rake angle may be varied considerably depending upon the primary nature of the material into which the screw is intended to be driven.

The effective diameter or transverse width of the drill point 31, as indicated at 44, is seen to be greater than the diameter of the root 46 of the thread 38 but substantially less than the diameter of the crest 48 thereof. It may desirably be made approximately equal to or slightly larger than the pitch diameter. In the operation of the screw after the cutting edges 40, 41 drill through the work, the tapered end portion of the thread 38 forms a cooperating thread in the drilled hole and permits the screw to be driven home.

In accordance with the method of this invention the screw 30 is produced in the following manner. A cylindrical workpiece 52, such as shown in FIG. 1, of predetermined length is severed from a length of stock material (not shown) of predetermined diameter. This latter diameter is desirably that of the shank prior to threading. Preferably, the volume of the workpiece 52 is made substantially equal to the volume of the screw to be formed.

After the workpiece has been severed, it is initially formed into the blank 54 shown in FIG. 2. The blank 54 has a work-entering end portion 58 with a second diameter smaller than the original, or first diameter of the shank 56. An inwardly tapering intermediate portion 60 is formed between the shank 56 and end portion 58.

After the blank 54 shown in FIG. 2 is formed, the blank is transferred to a suitable holding die, not shown, and in which the work-entering end portion 58 including the intermediate portion 60 are positioned between a pair of laterally movable complementary die members 62, 63, in the manner shown in FIG. 12. Die members 62, 63 are respectively supported in an apparatus, not shown, of known construction having means for actuating the dies laterally toward and away from each other so as to cold forge the blank 54.

The die members 62, 63 have jaws 66, 67 which are offset with respect to each other and with respect to the longitudinal centerline 68 of the blank 54 when placed therebetween. The die members 62, 63 when closed completely surround the sides of the portions 58 and 60. Closing the die members 62, 63 causes the jaws 66, 67 to form the flutes 34 and the land portions 36 therebetween.

As shown in FIG. 12, the jaws 66, 67 have facing surfaces 70 which are inclined away from the longitudinal centerline 68 of the blank 54 in the direction of the work-entering extremity thereof. Preferably the surfaces 70 are tapered, such as, at a five degree angle to provide the forward faces 39 of the land portions 36 with the hook or rake angle hereinbefore described.

As shown in FIG. 13, each of the die members 62, 63 has a sidewall portion 73 which closely overlaps the jaw of the other die completely to surround the sides of the portions 58 and 60 of the blank 54. As shown in FIGS. 12 and 14, the dies 62, 63 have a depth greater than the length of portions 58 and 60 and substantially equal to the length of the drill point 31 of the completed screw 30.

Thus, although the jaws 66, 67 laterally completely surround the sides of the portions 58, 60 to confine the lateral expansion of such portions so as not to produce any lateral flashings, they permit unrestricted longitudinal extrusion of the complete cross section of such portions. Stated otherwise, the length of the work-entering end portion 58 and the intermediate portion 60 of the blank 54 is less than the depth of the die members 62, 63 when the blank 54 is first placed therebetween and before the jaws are closed. The cold forging effect thereof on the portions 58, 60 causes a limited lateral expansion without flash and an unrestricted longitudinal extrusion of the complete cross section of such portions which effectively lengthens the work-entering end of the screw so that the drill point 31 thus formed substantially equals the depth of the die members. FIGS. 2 and 3 illustrate the relative amount of the longitudinal extrusion that is achieved.

Each of the die members 62, 63 also has a curved wall portion 72 connecting its jaw and sidewall portion 73. The curved portions 72 have elements extending substantially parallel to the longitudinal centerline 68 of the blank 54, thereby to form the land portions 36 with substantially parallel outer sidewalls. The curved portions 72 have the same radius of curvature as the land portions 36 such that they define segments of a circle when in their fully closed position. Thus the land portions 36 are accurately formed with a controlled diametrical width substantially equal to the diameter of the shank 56.

The cold forging of the work-entering end of the screw also causes an elongated grain structure to be achieved in the drill point 31 and in the region of its junction to the shank 32. This grain structure extends generally parallel with the longitudinal centerline 68 of the blank 54 throughout the drill point 31 and includes the transitional region between such drill point and the shank 32. The tensile strength of the metal in the thus forged drill point is thereby rendered substantially greater than the tensile strength of the metal in the remainder of the blank. In addition, the metal of the transition region at the junction of the shank 32 and the drill point 31 is also provided with a relatively higher strength as compared with the strength of the metal prior to such forging.

Each of the inwardly extending corners 76 of the jaws 66, 67 is provided with a radius which gradually increases in the axial direction of the blank 54 toward the driving head 33 so as to provide a fillet 78 of gradually increasing size in each of the flutes 34. Such radius may desirably vary from one thirty-second inch at the work-entering extremity of the screw to one-eighth inch at the trailing end of the drill point to achieve the gradually increasing fillet 78 above mentioned. Fillet 78 provides the drill point 31 with greater strength where it joins the shank which region is subject to the greatest stress.

The forging of the work-entering end portion 58 and intermediate portion 60 of the blank 54 reduces the amount of material in the cross section of the drill point 31 while it increases the longitudinal length thereof. The cold forging, however, causes the diametrical width across the land portions 36 to become substantially equal to the diameter of the shank and preferably slightly larger, approximating the pitch diameter of the thread 38. The closely overlapping jaws 66, 67, however, eliminate all lateral flashing.

After the thus cold forged blank 54 is removed from the dies 62, 63, it is clamped in a suitable jig and the tip 80 thereof is machined to form the drilling or cutting edges 40, 41 which are provided with a relief 82. It should be noted that during this operation the shank 56 of the blank 54 is unthreaded, thereby to permit it easily to be clamped in the machining jig.

The screw is then rolled between suitable dies (not shown) to form the thread 38 thereon. Since the effective diameter or transverse width of the drill point 31 across the land portions 36 is greater than the root diameter but less than the crest diameter, the crest diameter of a female thread cut by the screw 30 will be less than the width of the drill point 31, so that after the screw has been driven home it will be substantially locked in place.

While I have described my invention with respect to the manufacture of one particular embodiment, it should be realized that the invention permits numerous modifications as to arrangement and detail. I therefore claim as my invention all such modifications as come within the true spirit and scope of the following appended claims.

I claim:

1. A method of making a drill point, self-thread-forming screw which comprises:

forming a cylindrical workpiece into a blank having a shank portion and a work-entering end portion having a diameter smaller than the diameter of said shank portion, the invention being characterized by:

a. forming a drill point by cold forging said end portion between a pair of laterally movable complementary die members which completely surround the sides of said portion to effect both limited lateral expansion and unrestricted longitudinal extrusion of said portion;

b. and during said cold forging of said portion forming à pair of flutes on opposite sides thereof extending the length of the extruded end portion;

c. and further during said cold forging operation confining the lateral expansion of said end portion by said die members so as not to produce any lateral flashings while forming a pair of longitudinally extending land portions between said pair of flutes;

d. machining the tip of said drill point to form a pair of cutting edges on said land portions at the forward extremities thereof; and e. forming threads on said shank portion.

2. A method according to claim 1, wherein said step of forming a cylindrical work piece into a blank includes the step of providing a head at one end of said blank.

3. A method according to claim 1, wherein said step of forming the cylindrical work piece into a blank includes the step of providing an inwardly tapering intermediate portion, and said step of forming the drill point by cold forging includes the step of forming said intermediate portion in conjunction with said end portion.

4. A method according to claim 1, wherein the step of forming a pair of longitudinally land portions includes the step of controlling the dimensions of said land portions such that they are provided with substantially parallel outer side walls and a diametrical width substantially equal to the diameter of said shank portion.

5. A method according to claim 1, wherein the step of forming threads on the shank portion includes the step of roll threading said shank portion.

6. A method according to claim 1, wherein said step of forming the drill point by cold forging between a pair of laterally complimentary diameters includes the step of providing side wall portions on each said diameter which overlaps the opposed diameter to effect said confining of the lateral expansion of said end portion thereby precluding the formation of flashings.

* * * * *